United States Patent [19]
McKenzie

[11] Patent Number: 5,927,267
[45] Date of Patent: Jul. 27, 1999

[54] MULTI-LEVEL BARBECUE WARMING RACK

[75] Inventor: Stuart McKenzie, Wyevale, Canada

[73] Assignee: Fiesta Barbegues Limited

[21] Appl. No.: 09/139,389

[22] Filed: Aug. 25, 1998

[51] Int. Cl.[6] .................................................. A47J 37/00
[52] U.S. Cl. ..................... 126/41 R; 126/25 R; 126/332; 126/334; 211/153; 211/181.1
[58] Field of Search ................ 126/25 R, 41 R, 126/38, 29, 30, 332–340, 9 R, 9 B; 99/448, 449, 450; 211/181.1, 153; D7/408, 329, 330

[56] References Cited

U.S. PATENT DOCUMENTS

| | | | |
|---|---|---|---|
| 3,046,970 | 7/1962 | Seaman | 129/9 R |
| 3,224,357 | 12/1965 | Rubens | 126/25 R |
| 4,979,437 | 12/1990 | Giebel | 126/25 R |
| 5,050,577 | 9/1991 | Baynes et al. | 126/41 R |
| 5,088,470 | 2/1992 | James, Jr. et al. | 126/25 R |

Primary Examiner—James C. Yeung

[57] ABSTRACT

A two tiered warming rack makes use of the additional height of the upper housing of a gas grill and utilizes the support linkage of the first warming rack. The second warming rack is fixed to the first rack and moves therewith. The second rack is generally parallel to the first rack and maintains the same orientation as the first rack. Preferably, the second rack is supported in a cantilevered manner from the rear portion of the first rack.

8 Claims, 2 Drawing Sheets

MULTI-LEVEL BARBECUE WARMING RACK

FIELD OF THE INVENTION

The present invention is directed to an outdoor grill having a multi-level warming rack which is pivotally secured to the barbeque and moves in position when the grill is open.

BACKGROUND OF THE INVENTION

Outdoor barbeque grills and warming racks for barbeque grills are well known. Many of these barbeque grills have a lower housing and an upper housing and the upper housing is pivotally connected to the lower housing to move between a closed position, defining a cooking chamber to an open position exposing the lower housing for access of any food supported thereon. Typically, the lower housing supports a stationary cooking grill at one of a number of different height positions. A warming rack which is smaller in size than the cooking grill is pivotally secured to the upper housing and includes a pivoting front link to move with the upper housing in a manner to keep the warming rack generally horizontal. The warming rack in the closed position of the upper housing is closer to the cooking grill and in the raised position, moves upwardly and rearwardly to provide better access to the cooking grill. This warming rack typically includes a rod member pivotally secured in ports in the housing and a front pivoting linkage arrangement for providing the necessary parallelogram linkage.

The upper housing is typically quite high and in many cases, there is sufficient room to provide a second warming rack. The second warming rack is pivotally secured to the first warming rack by a linkage and is supported in a slot in the upper housing to allow for the additional movement provided at the upper housing. These types of warming racks have not proven popular, possibly because of the further modifications required to the upper housing as well as the somewhat complicated linkages involved.

The concept of the second warming rack is desirable, however, the additional costs and apparent complications, provide a substantial obstacle to the use of the structures.

The present invention provides a simple cost effective arrangement for overcoming the above deficiencies and providing the benefits of a second warming rack.

SUMMARY OF THE INVENTION

A barbeque grill according to the present invention comprises upper and lower housing members which cooperate to form a hinged connection along adjacent edges with the housings moving between a closed position forming an enclosure within which food is grilled to an open position, providing full access to the lower housing member. The barbeque grill further comprises a cooking grill located within the lower housing and a warming rack arrangement thereabove. The warming rack arrangement includes a first rack and a second rack which are fixed, one to the other, and stacked one above the other. The second rack is generally parallel to the first rack. The first rack includes a front pivoting linkage supporting said rack on the sides of the lower housing and a pivoting arrangement supporting the first rack from the upper housing at a rear edge of the first rack. The pivoting linkage and the pivoting arrangement cooperate to maintain the first rack generally horizontal. With this arrangement, the second rack maintains its spacing from the first rack as they are fixed one to the other, and as the second rack is generally parallel to the first rack, it also maintains the same orientation as the first rack during movement of the first rack when the housings are moved from the closed to the open position.

According to an aspect of the invention, the second rack is supported in a cantilever manner from a rear portion of the first rack.

According to a further aspect of the invention, the first rack and the second rack are connected adjacent rear portions the first and second rack by a forwardly inclined support arrangement forming an extension of the first rack.

According to yet a further aspect of the invention, the second rack is smaller in depth than the first rack and is located above and within the depths of the first rack.

According to yet a further aspect of the invention, the second rack is sized to be approximately half the size of the first rack and located primarily above a rear portion of the first rack.

According to yet a further aspect of the invention, the first rack has a multiplicity of parallel elongate members extending in a front to back direction, which form a food support surface of the first rack. These elongate members at the back of the first rack bend upwardly and forwardly joining with the second rack and forming a food support surface of the second rack. The elongate members are preferably the wire or bar members of the racks.

According to yet a further aspect of the invention, the first and second rack includes reinforcing members extending across the elongate members and secured thereto.

According to yet a further aspect of the invention, the elongate members at a back edge of the second rack include a bent section to stiffen the members providing the cantilevered support of the second rack.

The multi-level warming rack of the present invention is easy to manufacture and is easy to install and use. It has no additional pivoting linkages relative to a first warming rack yet it provides additional warming surfaces at a height above the first rack and thus gives the user a further option for cooking and warming.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
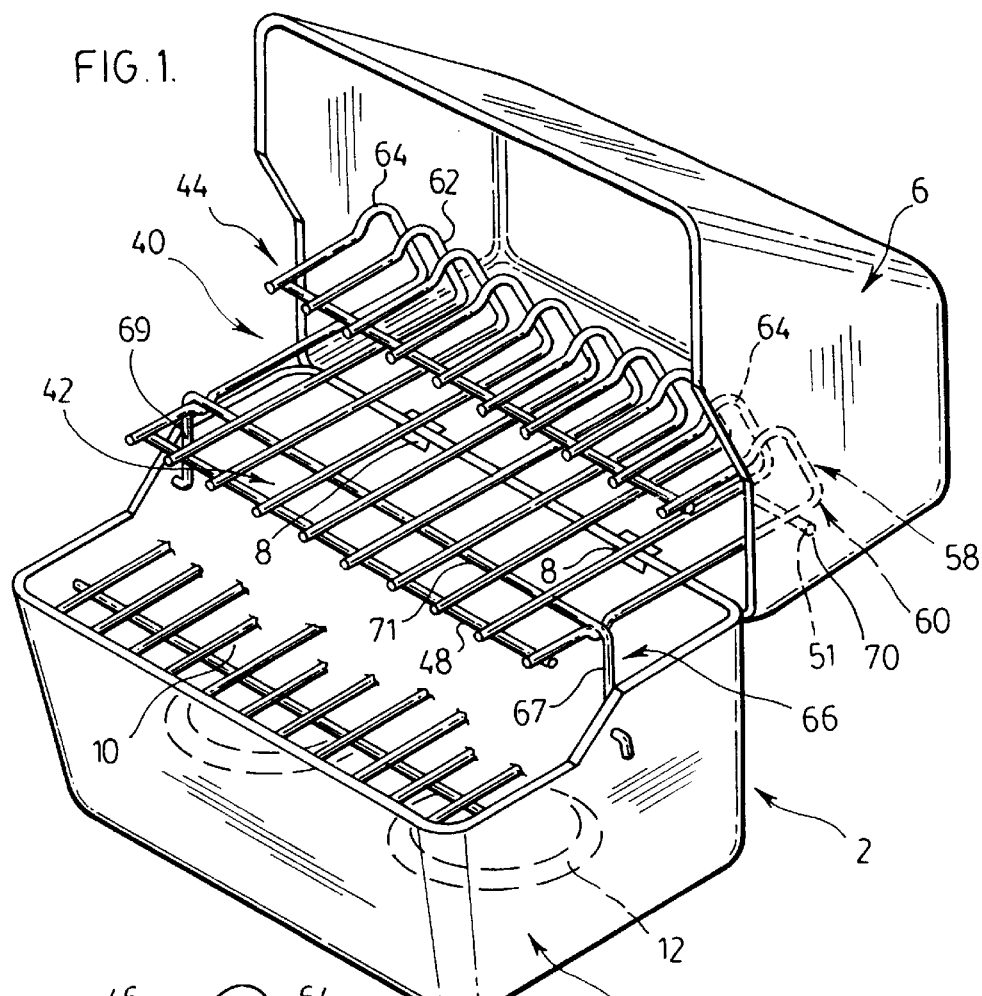
FIG. 1 is a perspective view of a barbeque grill in the open position and having the multi-level warming rack.
Figure 3:
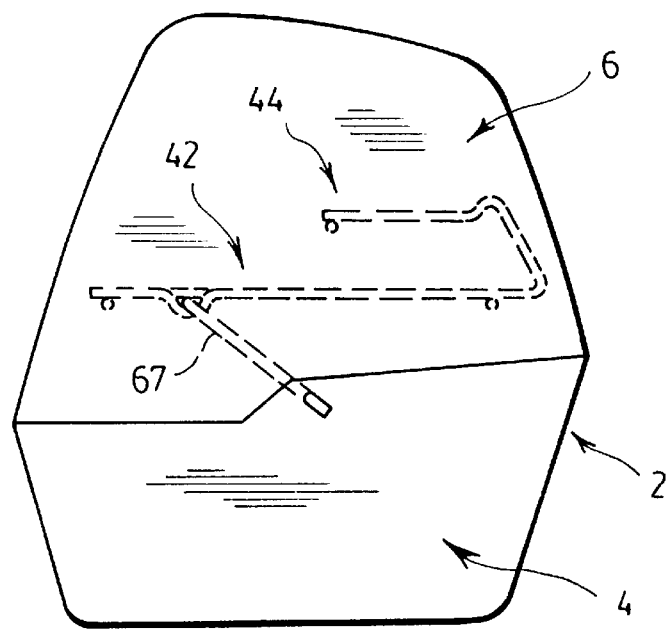
FIG. 3 is an end view showing the warming rack in a closed orientation of the barbeque grill.
Figure 4:
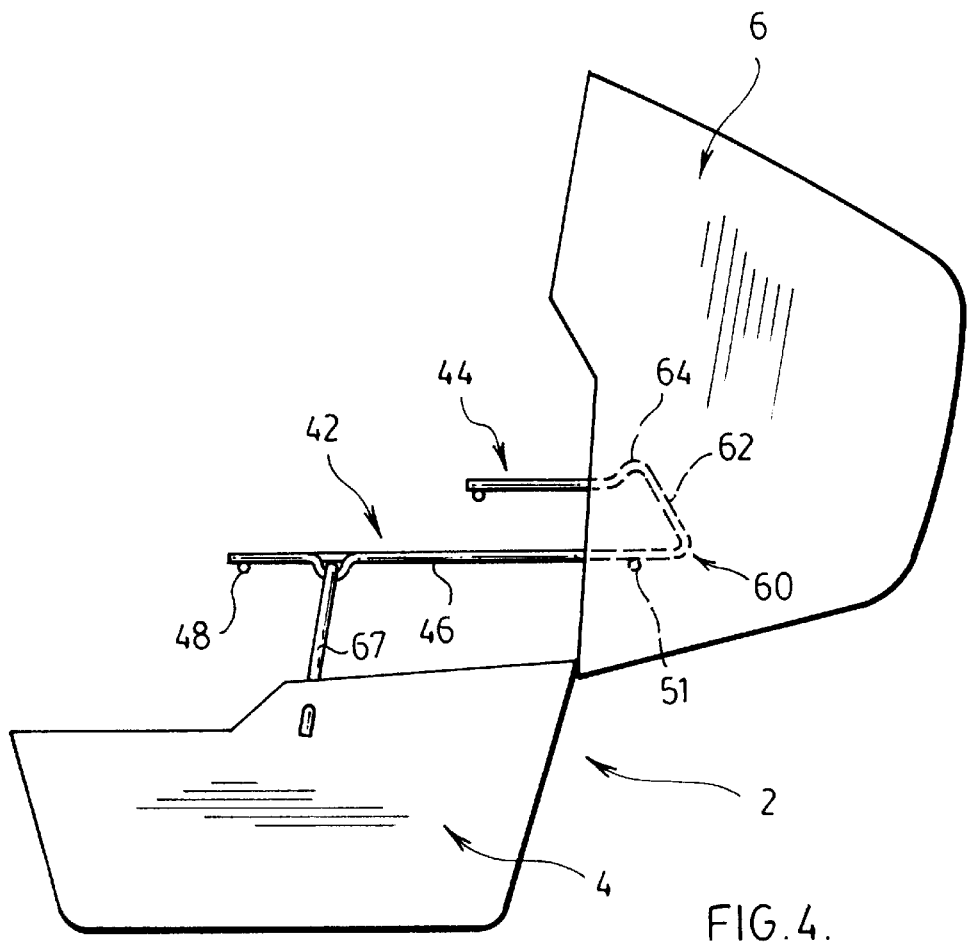
FIG. 4 is an end view showing the warming rack with the barbeque grill in an open orientation.

The barbeque grill 2 shown in FIG. 1 includes a lower housing 4 and an upper housing 6 which typically include a hinged connection 8 along a rear edge of the housing. The lower housing supports a cooking grill 10 at an upper surface of the lower housing. A gas burner 12 is provided in the lower part of the housing. The upper housing is movable relative to the lower housing from the closed orientation of FIG. 3 to the open orientation of FIGS. 1 and 4.

A warming rack arrangement 40 includes a first rack 42, and a second rack 44 which is fixed to and moves with the first rack. The first rack has a multiplicity of individual tines 46 or wire bars which run in a front to back direction with the tines being parallel. The tines adjacent the back 58 of the rack arrangement bend upwardly and forwardly to form the upwardly forwardly orientated section 62. This portion terminates in a stiffening bend 64 provided at the rear of the second rack. The tines 46 then extend forwardly and form part of the second rack 44.

The first rack includes stationary tie bars 48 and 50 which are each fixed to the tines 46. The second rack includes at a front edge thereof, tie bar 52. One tie bar has proven sufficient for the second rack, however, additional tie bars can be provided as desired.

The tie bar 50 of the first rack includes extensions 51 on either side of the rack which pass through ports 70 in the upper housing and form a pivot type connection with these extensions. This arrangement is common with a first warming rack.

The warming rack arrangement adjacent the front portion of the first rack includes a pivoting linkage 66. The pivoting linkage 66 includes two downwardly extending arms 67 and 69 which engage the lower housing on either side thereof, and generally form a loose pivot connection with the side of the lower housings. These members are joined by a connecting section 71 which passes under the tines 40 and forms a pivot connection with the first rack. This is a similar support arrangement for a single tier warming rack used with gas grills.

Figure 2:
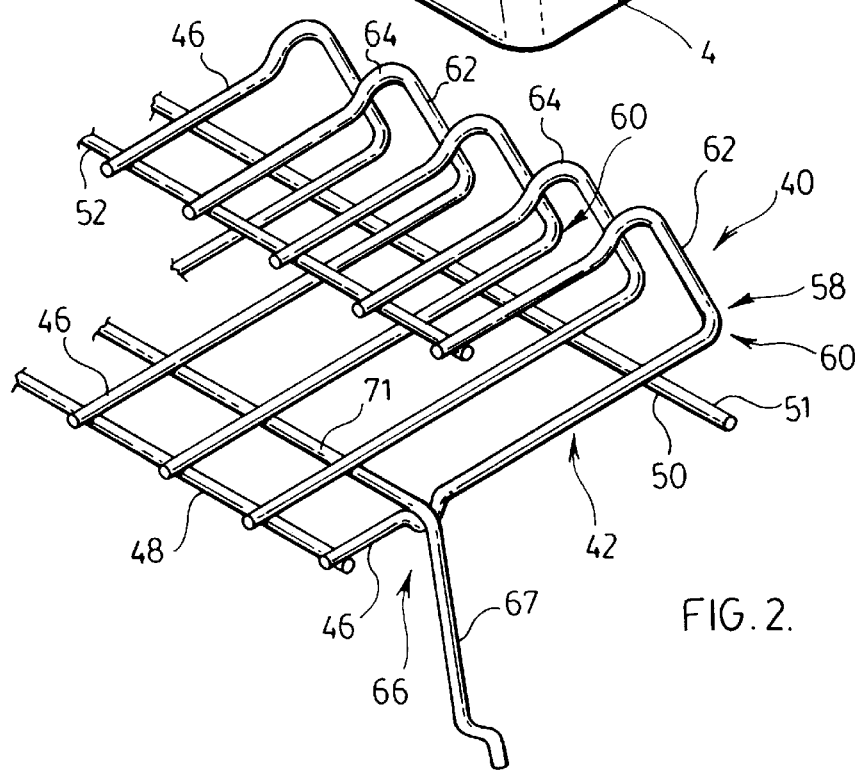
FIG. 2 is a partial perspective view showing details of the multi-level warming rack.

In FIG. 2, it can be see how the individual tines 46 extend to the back portion 58 of the first rack and then undergo a curved bend indicated as 60 to join with the upwardly and forwardly extending portion 62. The tines then include the upper stiffening bend 64 prior to joining the body of the second rack 44. The stiffening bends also form a back raised edge to the second rack. The tines 46 are held at the front edge of the second rack by means of the tie bar 52 which is secured to each of the tines. It can be appreciated that the first warming rack and the second warming rack can be initially made as a horizontal warming rack with tie bars 48 and 50 being located on one side of the racks with tie bar 52 located to the opposite side of the racks. This flat rack can then be bent to form bends 60 and 64 as well as the inclined portion 62. The second rack is fixed to the first rack and is parallel to the first rack. The linkage arrangement associated with the first rack maintains a generally horizontal orientation of the first rack during movement of the upper housing from the closed position to the open position. As the first rack remains generally horizontal in this movement, so will the second rack.

The multi-level warming rack of the present invention, can be manufactured in a simple cost effective manner and provides additional warming capacity due to the presence of the second rack.

The second rack is supported in a cantilever manner from the back of the first rack and extends over a rear portion of the first rack but terminates well short of the front of the first rack. This arrangement allows good access to the first rack which is of a larger surface area while also allowing the second rack to be easily accessed. The upwardly and forwardly angled portion 62 generally corresponds with the upwardly and forwardly angled portion of the upper housing when it is in the closed position. Thus it is desirable to move the second warming rack slightly forwardly of the first rack to accommodate the decreasing volume of the upper housing.

The warming rack has been described with respect to support of the second rack above the first rack by means of the tines 46, however, other arrangements are possible. By using the tines, the rack can be easily made in a horizontal manner and then bent to the desired configuration. It can also be appreciated that other support arrangements can be used and the present invention is not limited to this particular support arrangement. The second rack is fixed relative to the first rack and basically relies on the movement of the first rack to control the movement of the second rack.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A barbecue grill comprising upper and lower housing members which cooperate to form a hinge connection along adjacent edges, said housings being movable about said hinge connection between a closed position, forming an enclosure within which food is grilled to an open position providing full access to said lower housing member, said barbecue grill further comprising a cooking grill located and supported within said lower housing, and a warming rack arrangement; said warming rack arrangement including a first rack and a second rack with said second rack fixed to said first rack and stacked thereabove, said second rack being generally parallel to said first rack, said first rack including a front pivoting linkage supporting said first rack on sides of said lower housing and a pivoting arrangement supporting said first rack from said upper housing at a rear edge of the rack, said pivoting linkage and said pivoting arrangement cooperating to maintain said first rack generally horizontal between said open and closed position.

2. A barbecue grill as claimed in claim 1 wherein said second rack is supported in a cantilevered manner from a rear portion of said first rack.

3. A barbecue grill as claimed in claim 2 wherein said first rack and said second rack are connected adjacent rear portions of the first and second rack by a forwardly inclined support arrangement forming an extension of said first rack.

4. A barbecue grill as claimed in claim 2 wherein said second rack is smaller in depth than said first rack and is located above and within the depth of said first rack.

5. A barbecue grill as claimed in claim 4 wherein said second rack is approximately half the size of said first rack.

6. A barbecue grill as claimed in claim 2 wherein said first rack has a multiplicity of parallel elongate members extending in a front to back direction which form a food support surface of the first rack, said elongate members at the back of said first rack bending upwardly and forwardly joining with said second rack and forming a food support surface of said second rack.

7. A barbecue grill as claimed in claim 5 wherein said first and second rack include reinforcing members extending across said elongate members and secured thereto.

8. A barbecue grill as claimed in claim 6 wherein said elongate members at a back edge of said second rack include a bent section to stiffen the cantilevered support of said second rack.

\* \* \* \* \*